(12) United States Patent
Hashimoto

(10) Patent No.: US 6,641,856 B1
(45) Date of Patent: Nov. 4, 2003

(54) BEVERAGE CONTAINING A KAYU-LIKE FERMENTATION PRODUCT

(76) Inventor: Kikue Hashimoto, No. 2718, Izumi-cho, Izumi-ku, Yokohama (JP)

( * ) Notice: Subject to any disclaimer, the term of this patent is extended or adjusted under 35 U.S.C. 154(b) by 0 days.

(21) Appl. No.: 09/214,231
(22) PCT Filed: Jun. 11, 1998
(86) PCT No.: PCT/JP98/02572

§ 371 (c)(1),
(2), (4) Date: Dec. 31, 1998

(87) PCT Pub. No.: WO98/56262

PCT Pub. Date: Dec. 17, 1998

(30) Foreign Application Priority Data

Jun. 13, 1997 (JP) .............................. 9/191724

(51) Int. Cl.⁷ .............................. A23L 2/38; A23L 1/20
(52) U.S. Cl. .................................... 426/598
(58) Field of Search .................. 426/46, 44, 62, 426/622, 629, 634, 640, 590, 598

(56) References Cited

FOREIGN PATENT DOCUMENTS

| JP | 1-199551 | * | 10/1989 |
| JP | 2-39866 | * | 2/1990 |
| JP | 3-39059 | * | 2/1991 |
| JP | 3-67556 | * | 3/1991 |
| JP | 3-98564 | * | 4/1991 |
| JP | 4-281756 | * | 10/1992 |
| JP | 60-248135 | * | 12/1995 |

OTHER PUBLICATIONS

Steinkraus, Keith. Handbook of Indigenous Fermented Foods; Marcel Dekker, Inc. Pub., pp. 442, 545–556, 1996.*

* cited by examiner

*Primary Examiner*—Keith Hendricks
(74) *Attorney, Agent, or Firm*—Mallinckrodt & Mallinckrodt; Robert R. Mallinckrodt

(57) ABSTRACT

The present invention is based on a fermentation product produced by adding koji (rice or bean yeast) to boiled and/or steamed beans and allowing the mixture to ferment and mature. The fermentation product is kayu-like. Various foodstuffs and beverages can be prepared from such a fermentation product. Such fermentation products, foodstuffs and beverages are novel, tasty and rich of nutrients but do not contain salt or, if they do, contain salt only to a small degree. Such products are highly effective and useful as dietary food or drink.

2 Claims, No Drawings

BEVERAGE CONTAINING A KAYU-LIKE FERMENTATION PRODUCT

This application is a 371 National Stage application of PCT/JP98/0257 filed Jun. 11, 1998.

BACKGROUND OF THE INVENTION

1. Field of the Invention

This invention generally relates to food and drink and, more particularly, it relates to a fermentation product produced by using beans as raw material and also to novel foodstuffs and beverages produced by using such a fermentation product as raw material.

2. Description of Background Art

It is well known that beans are rich of nutrients including protein and lipid. Beans are taken as principal as well as auxiliary foodstuffs and used as raw material for producing seasonings and cakes. Beans are often cooked before taken as food. Food and drink products made from soy beans include tofu (soy bean curd), tonyu (soy bean milk) and kinako (soy bean flour). Japanese miso (soy bean paste) and shoyu (soy bean sauce) and among typical fermentation products of soy beans.

Tofu (soy bean curd), tonyu (soy bean milk) and kinako (soy bean flour) are traditional Japanese foodstuffs having their origins that can be traced back by centuries. Of these, tofu (soy bean curd) appears almost daily in dishes in Japan and miso (soy bean paste) and shoyu (soy bean sauce) are ubiquitous seasonings in Japan. Kinako (soy bean flour) is often mixed with sugar and used to coat cakes therewith. Tonyu (soy bean milk) is a beverage that looks like cow milk but is popular only among a limited number of people because of its peculiar flavor.

Tofu (soy bean curd) has a strong demand in Japan because of its particular taste and flavor and also because it is believed to be very good for health. However, tofu (soy bean curd) contains water by almost about 90%. In other words, the single predominant content of tofu (soy bean curd) is water. If compared with soy beans, tofu (soy bean curd) contains less protein and lipid than soy beans by 28% and 14% respectively, to say nothing of other nutrients. A large volume of lees is left in the process of preparing tofu (soy bean curd) to reduce the yield of tofu (soy bean curd) manufacturing. Additionally, the scope of application of tofu (soy bean curd) is limited in terms of recipies for cooking tofu (soy bean curd). Tofu (soy bean curd) is easy to break and lose its original shape to add to its other disadvantages. Furthermore, tofu (soy bean curd) cannot replace bun or scone and is not easily portable. Tonyu (soy bean milk) is an intermediary product in the process of producing tofu (soy bean curd) and hence its contents are similar to those of tofu (soy bean curd). It is mostly used as soft drink among few people who like it. Kinako (soy bean flour), on the other hand, is as rich of nutrients as soy beans and contains substantially no moisture to make it a desirable foodstuff. However, kinako (soy bean flour) is not very appealing because it has been taken by people for centuries to make it very commonplace in terms of both appearance and taste.

As for miso (soy bean paste) and shoyu (soy bean sauce), they have no applications other than seasoning because they contain salt as much as 6% to 12% and hence they taste extremely salty.

The inventor of the present invention proposed a soft drink of natural origin showing the flavor of miso (soy bean paste) and the sweetness of fruit juice and having a high nutritional value in U.S. Pat. No. 1,947,954 (see Japanese Patent Publication No. 6-75486). The patented soft drink is really epoch-making as it broke the rigid idea that miso (soy bean paste) is nothing but a seasoning.

However, since the above patented soft drink is devised to contain most of the nutrients of miso (soy bean paste), it also inevitably contains salt to a large extent if it is to be made nutritionally as rich as miso (soy bean paste). Additionally, it can lose the flavor of soft drink when it is made to contain miso (soy bean paste) to a large extent.

SUMMARY OF THE INVENTION

Therefore, the object of the present invention is to solve the above identified problem by providing a fermentation product produced by using beans as raw material and also novel foodstuffs and beverages produced by using such a fermentation product as raw material. In other words, the object of the present invention is to provide a fermentation product produced by using beans as raw material and also a variety of foodstuffs and beverages produced by using such a fermentation product as raw material that are novel, tasty and rich of nutrients but do not contain salt or, if they do, contain salt only to a small degree.

According to a first aspect of the invention, the above object is achieved by providing a fermentation product produced by adding koji (rice or bean yeast) to boiled and/or steamed beans and allowing the mixture to ferment and mature.

A fermentation product according to the first aspect of the invention is produced by utilizing yeast and slightly has the flavor of beans. However, it tastes very differently if compared with beans to appeal itself as a very novel food product. A fermentation product according to the invention has a high nutritional value because the nutrients of beans are almost all there. Additionally, no lees nor dregs are produced in the course of fermentation to raise the manufacturing yield. While a fermentation product according to the invention may be taken just as it is, it can be made to taste to meet your preference by adding sweetening seasonings, salty seasoning and/or other seasonings appropriately. A fermentation product according to the invention comes to appear like kayu when beaten and kneaded and the kayu-like product is liquidized by adding liquid to it and mixing them well. A fermentation product according to the first aspect of the invention can be used as a material for preparing a novel dish. As a fermentation product according to the first aspect of the invention is produced by fermenting beans and maturing the fermented beans, it will be digested better than ordinary cooked beans. Additionally, it operates well to clean the bowels because it contains dietary fibers.

According to a second aspect of the invention, there is provided a fermentation product produced by adding koji (rice or bean yeast) to seasoned and boiled and/or steamed beans and allowing the mixture to ferment and mature.

A fermentation product according to the second aspect of the invention is substantially the same as a product according to the invention except that seasoned beans are used as raw material.

According to a third aspect of the invention, there is provided a fermentation product produced by adding koji (rice or bean yeast) and one or more than one seasonings to boiled and/or steamed beans and allowing the mixture to ferment and mature.

A fermentation product according to the third aspect of the invention is substantially the same as a product according to the invention except that not only koji (rice or bean yeast) but also one or more than one seasonings are added to boiled and/or steamed beans.

According to a fourth aspect of the invention, there is provided a dry foodstuff produced by drying a fermentation product according to any of the first through third aspects of the invention.

Since a dry foodstuff according to the fourth aspect of the invention is obtained by drying a fermentation product according to the invention for the ease of handling and storage, it can be made to restore the original form simply by dissolving it into cold or hot water. However, the dry foodstuff can also be taken without dissolving it into water and preferably by spreading sauce, mayonnaise, ketchup, shoyu (soy bean sauce), butter or jam on it. It can be turned into a liquid or kayu-like state by adding milk, juice or seasoning solution to it to make it more comfortable to eat. A dry foodstuff according to the fourth aspect of the invention can also be used as a material for preparing a dish.

According to a fifth aspect of the invention, there is provided a powdery foodstuff obtained by milling a dry foodstuff according to the fourth aspect of the invention into a powdery sate.

A powdery foodstuff according to the fifth aspect of the invention can be taken with or without seasonings added to it. A powdery foodstuff according the fifth aspect of the invention can also be used as a material for preparing a dish.

According to a sixth aspect of the invention, there is provided a baked foodstuff obtained by baking a fermentation product according to any of the first through third aspects of the invention. Before baking a fermentation product for the purpose of the sixth aspect of the invention, it may be beaten and kneaded to show an appropriate form.

A baked foodstuff according to the sixth aspect of the invention is obtained by baking a fermentation product according to the invention for the ease of handling and storage. Additionally, it is balmy because it is baked. A baked foodstuff according the fifth aspect of the invention can also be used as a material for preparing a dish.

According to a seventh aspect of the invention, there is provided a powdery foodstuff obtained by milling a baked foodstuff according to the sixth aspect of the invention into a powdery sate.

A powdery foodstuff according to the seventh aspect of the invention can be taken with or without seasonings added to it. A powdery foodstuff according the seventh aspect of the invention can also be used as a material for preparing a dish.

According to an eighth aspect of the invention, there is provided a beverage obtained by adding drinkable liquid to and mixing it with a fermentation product according to any of the first through third aspect of the invention. Preferably, the fermentation product is beaten and kneaded into a kayu-like state before being mixed with the liquid.

Liquids that can be used for producing a beverage according to the eighth aspect of the invention include water (tap water, distilled water, mineral water), soft drink, fruit juice, vegetable juice, alcoholic drink, and soup. Thus, a beverage according to the eighth aspect of the invention has a nutritional value and a calorific value obtained by adding those of the liquid to those of the fermentation product. Furthermore, a beverage according to the invention has a novel flavor produced by the mixture of a fermentation product according to the invention and a specific type of drink added thereto. Fruit flesh including the flesh of ume (*Prunus mume*, Japanese apricot) may be added to a beverage according to the invention.

According to a ninth aspect of the invention, there is provided a powdery foodstuff obtained by drying a beverage according to the eighth aspect of the invention.

A beverage is prepared instantaneously by dissolving a powdery foodstuff according to the eighth aspect of the invention into cold or hot water. Therefore, it has a great advantage of easy handling and storage. Additionally, each particle of the powdery product may show any appropriate profile.

DESCRIPTION OF THE BEST MODES OF CARRYING OUT THE INVENTION

The two principal materials to be used for producing a fermentation product according to the invention are beans and yeast.

Beans that can be used for the purpose of the invention include all sorts of beans that are currently used as food such as soy beans, green peas, kidney beans, broad beans and adzuki (*Phaseolus angularis*) beans. Yeast that can be used for the purpose of the invention include all sorts of yeast that are currently used for fermentation such as rice yeast, barley yeast and wheat yeast. While both solid yeast and liquid yeast may be used for the purpose of the invention, solid yeast will be a preferable choice.

The two principal steps in the process of producing a fermentation product according to the invention are a steaming/boiling step and a fermentation/maturing step. A dipping step may be provided prior to the steaming/boiling step. A heat treatment step may be arranged after the fermentation/maturing step to stop the ongoing fermentation of the raw material beans.

When a dipping step is used, the raw material beans are washed well with water and dipped in water for a full day. Thereafter, in the following steaming/boiling step, the raw material beans are boiled and/or steamed for about 30 minutes to one hour. More specifically, they are boiled and/or steamed until the skin of the beans are broken and/or the beans collapse. The ratio of combining (steamed/boiled) raw material beans and yeast may vary depending on the circumstances. They may be combined at a ratio of 50:50 or in favor of either of them. In the fermentation/maturing step, yeast is added to the steamed/boiled raw material beans and the mixture is held to fermentation temperature between 50° C. and 70° C., preferably of 60° C., for 6 to 12 hours.

A fermentation product obtained at the end of the fermentation/maturing step is very soft. If moisture is added to the mixture of the raw material beans and the yeast to a large proportion during the fermentation/maturing step, the obtained fermentation product may show a kayu-like state. However, normally the obtained fermentation product is beaten and kneaded to bring it into a kayu-like state. The fermentation product contains the nutrients of beans when they are used to a large proportion, whereas it tastes considerably sweet when yeast is used to a large proportion.

When seasoned and boiled and/or steamed beans are used as raw material, the fermentation product will be significantly affected by the seasoning(s) added to the beans. Similarly, when seasoning(s) and yeast are added to boiled and/or steamed beans before the fermentation/maturing step, the fermentation product will also be significantly affected by the seasoning(s).

When a heat treatment step is used to stop the fermentation of the product, the product will typically be heated to a temperature above about 80° C.

A dry foodstuff according to the invention is obtained by drying a fermentation product according to the invention.

More specifically, a fermentation product containing moisture to a relatively small extent is prepared and then beaten and kneaded to show a desired shape. A commercially available drier may be used to dry the fermentation product or, alternatively, the latter may be dried simply under the sun, although the use of a drier may be preferable for the purpose of the invention. The dry foodstuff may preferably take the form of flat, block-shaped, disk-shaped or granular pieces for the purpose of marketing.

For the purpose of the invention, a powdery foodstuff is produced by grinding a dry foodstuff according to the invention. The dry foodstuff may be ground into a powdery foodstuff in a mortar and pestle or a commercially available mill particularly when the latter is to be produced continuously on a mass production basis.

For the purpose of the invention, a baked foodstuff is produced by baking a fermentation product according to the invention and containing moisture to a small extent that has been ground in a manner as described above. More specifically, an oven or a frying pan will be used to bake a fermentation product into a baked foodstuff. As in the case of a dry foodstuff according to the invention, the baked foodstuff may also take the form of flat, block-shaped, disk-shaped or granular pieces for the purpose of marketing.

For the purpose of the invention, a beverage is prepared by adding liquid to a fermentation product according to the invention that has been ground in a manner as described above. The liquid may be any drinkable liquid, which may be stirred and mixed with the fermentation product in an appropriate mixer. Fruit flesh including the flesh of ume (*Prunus mume*, Japanese apricot) may be added to a beverage according to the invention after or without crushing the former.

For the purpose of the invention, a dry foodstuff is prepared by drying a beverage according to the invention to reduce the dried beverage into a powdery state. More specifically, such a dry foodstuff can be produced by means of a known hot-air-drying, freeze-drying or natural drying technique and grinding the obtained dry product.

Now, a fermentation product, a foodstuff and a beverage according to the invention will be described by way of examples.

EXAMPLE 1

A 3,000 cc of water was added to a 200 g of commercially available round soy beans, which were boiled until the skin thereof was broken. Subsequently, the boiled soy beans were cooled to about 60° C., when solid yeast (rise yeast) was added thereto to allow the soy beans to ferment and mature for 10 hours. The obtained fermentation product was then crushed into a kayu-like state. While the kayu-like fermentation product may taste like beans and slightly give off the sweet flavor of yeast to a curious taster, it only gives a novel taste that is not associated with soy beans to ordinary people who do not know anything about the origin of the product.

EXAMPLE 2

A 20 g of the kayu-like fermentation product obtained in Example 1 was dissolved into 200 cc of distilled water to produce a beverage. The obtained beverage tasted like beans to a lesser extent and practically did not give off at all the sweet flavor of yeast. Additionally, it was free from the pasty touch of glue. Then, 100 cc of pineapple juice was added to the beverage and stirred well to produce a homogeneous mixture. The mixture of the beverage and the fruit juice gave a novel, fresh and pleasant taste produced by the synergetic effect of the fermentation product with good body and the pineapple juice having a sweet and sour taste.

EXAMPLE 3

The kayu-like fermentation product obtained in Example 1 was dried by means of a drier until the moisture content is reduced to 5%. The dry (solid) foodstuff had a touch of crackers and came to taste just like the above described fermentation product when it is chewed for a while. Little children will like it when butter or jam is spread on it.

The table below shows the contents of 100 g of the dry foodstuff of Example 3 and that of a 100 g of the raw material soy beans for the purpose of comparison.

|  | raw material beans (soy beans) | dry foodstuff (Example 3) |
| --- | --- | --- |
| calorie | 392 kcal | 426 kcal |
| moisture | 12.0 g | 5.0 g |
| protein | 34.3 g | 37.4 g |
| lipid | 17.5 g | 19.2 g |
| sugar | 26.7 g | 30.5 g |
| fiber | 4.5 g | 2.9 g |
| ash | 5.0 g | 5.0 g |
| calcium | 190 mg | 190 mg |
| sodium | 3 mg | 4 mg |
| phosphor | 470 mg | 500 mg |
| iron | 7.0 mg | 9.0 mg |
| Vitamin A | 6 µg | 5 µg |
| Vitamin B1 | 0.50 mg | 0.45 mg |
| Vitamin B2 | 0.20 mg | 0.15 mg |
| nichotinic acid | 2.00 mg | 2.00 mg |
| Vitamin C | 0 | 0 |

As seen from the preceding table, the dry foodstuff of Example 3 almost maintains the nutrients of the raw material soy beans. Since the dry foodstuff is obtained by drying the fermentation product of Example 1, it may be safe to say that the latter also maintains the nutrients of the raw material soy beans.

EXAMPLE 4

The kayu-like fermentation product of Example 1 was baked on a frying pan until the surface of the product turned brown. The obtained baked foodstuff (solid foodstuff) also had a touch of crackers but was different from the above described dry foodstuff in that the former issued a balmy fragrance as it was baked and was free from the taste and the smell of soy beans. A baked foodstuff as described above gets harder and more fragrant as it is baked for a longer period of time. It will become more tasty when butter or jam is spread on it.

EXAMPLE 5

The dry foodstuff of Example 3 and the baked foodstuff of Example 4 were ground into a powdery state. The obtained powdery foodstuff appeared like kinako (soy bean flour) but its taste and flavor differed from those of kinako (soy bean flour) because the former is produced from a fermentation product.

EXAMPLE 6

A 3,000 cc of water was added to 200 g of round soy beans whose skin had been removed and then boiled until the beans began to lose the shape. Thereafter, the temperature of the boiled beans was made to fall to about 60° C., when 50 g of solid rice yeast was added thereto to allow the beans to ferment. The product was left for maturing for about 10 hours. The obtained fermentation product was then beaten and kneaded into a kayu-like state. When compared with the fermentation product of Example 1, the kayu-like fermentation product of Example 6 is more free from the taste and the smell of soy beans probably because the skin of the raw material beans had been stripped off. Therefore, the kayu-like fermentation product of Example 6 gives a novel taste that is not associated with soy beans.

EXAMPLE 7

A 20 g of the kayu-like fermentation product obtained in Example 6 was dissolved into a 200 cc of 80° C. hot water to produce a hot beverage. While the hot beverage somewhat showed the fragrance of soy beans probably because it was hot, the fragrance was by no means disagreeable. Then, 20 g of blueberry jam was added to the hot beverage, which was stirred well to produce a homogeneous solution. The beverage gave a novel, fresh and pleasant taste produced by the synergetic effect of the fermentation product with good body and the blueberry jam having a sweet and sour taste. Additionally, the beverage showed a purple color.

EXAMPLE 8

A 3,000 cc of water was added to 200 g of commercially available black and round (dried) soy beans, which were then boiled until the skin became totally broken. Thereafter, the temperature of the boiled beans was made to fall to about 60° C., when a 50 g of solid rice yeast was added thereto to allow the beans to ferment. The product was left for maturing for about 10 hours to make it pasty. The pasty fermentation product of Example 8 showed a dark red color produced by mixing the black color of the skin with the white color of the flesh of the soy beans. As in the case of Example 7, the taste and the fragrance of the fermentation product of Example 8 remarkably differed from those of soy beans. The fermentation product obtained in Example 8 was then stored in a home refrigerator (at about 4° C.) for 80 days. No degeneration nor discoloration was observed on the fermentation product taken out of the refrigerator after 80 days of storage.

EXAMPLE 9

A 50 g of the fermentation product of Example 8 stored in the refrigerator was dissolved into a 300 g of distilled water to produce a beverage. The beverage was almost totally free from the smell of soy beans probably because it was cold and tasted slightly sweet due to the yeast it contained. The liquid product also showed a dark red color. The beverage also gave a novel, fresh and pleasant taste.

EXAMPLE 10

A 3,000 cc of water as added to a 100 g of commercially available white (dried) kidney beans, which were then boiled until the beans became completely broken. Thereafter, the temperature of the boiled beans was made to fall to about 60° C., when a 50 g of solid rice yeast was added thereto to allow the beans to ferment. The product was left for maturing for about 8 hours to make it pasty. The taste and the fragrance of the pasty fermentation product of Example 10 remarkably differed from those of kidney beans.

EXAMPLE 11

A 20 g of the pasty fermentation product obtained in Example 10 was dissolved into a 200 cc of 80° C. hot water to produce a hot beverage. While the hot beverage somewhat showed the fragrance of raw material kidney beans probably because it was hot but the fragrance was by no means disagreeable. It also tasted slightly sweet due to the rice yeast added thereto. Then, 60 cc of tangerine juice was added to the hot beverage, which was stirred well to produce a homogeneous solution. The beverage gave a novel, fresh and pleasant taste produced by the synergetic effect of the fermentation product with good body and the tangerine juice having a sweet and sour taste.

EXAMPLE 12

A 300 cc of water as added to a 100 g of commercially available (dried) adzuki beans, which were then boiled until the beans became completely broken. Thereafter, the temperature of the boiled beans was made to fall to about 60° C., when a 60 g of solid rice yeast was added thereto to allow the beans to ferment. The product was left for maturing for about eight hours to make it pasty. The taste and the fragrance of the pasty fermentation product of Example 12 remarkably differed from those of raw material adzuki beans.

EXAMPLE 13

A 20 g of the pasty fermentation product of Example 12 was dissolved into a 70 cc of distilled water to produce a beverage. The beverage had a slight fragrance of adzuki beans and tasted slightly sweet due to the yeast it contained. The taste was that of "adzuki bean soup" without sugar added thereto. Then, a 150 cc of water melon juice was added to the beverage, which was stirred well to produce a homogeneous solution. The beverage gave a novel, fresh and pleasant taste produced by the synergetic effect of the fermentation product with good body and the water melon juice having a sweet taste.

EXAMPLE 14

A 3,000 g of water was added to a 200 g of commercially available round (dried) soy beans, which were then boiled until the skin became totally broken. Thereafter, the temperature of the boiled beans was made to fall to about 60° C., when a 20 g of solid rice yeast was added thereto to allow the beans to ferment. The product was left for maturing for about eight hours. The obtained fermentation product was then beaten and kneaded into paste. Then, the pasty fermentation product was put into a hot air drier for drying and the dried product was ground into a powdery state. Thereafter, a 150 cc of 80° C. hot water was added to a 20 g of the obtained powdery foodstuff, which was then stirred well to produce a homogeneous hot beverage. The beverage was pleasant and slightly sweet to the throat and did not give any coarse feeling. It is more free from the taste and the smell of soy beans than at the stage of fermentation product. It was also free from the pasty feeling of the fermentation product.

EXAMPLE 15

A 200 g of banana was added to a 200 g of the fermentation product of Example 14 and the mixture was smashed into paste. The obtained pasty mixture was then put into a hot air drier for drying and the dried product was ground into a powdery state. Thereafter, a 150 cc of 80° C. hot water was added to a 20 g of the obtained powdery foodstuff, which was then stirred well to produce a homogeneous hot beverage. The beverage was highly sweet and showed the fragrance of banana and a slight stickiness attributable to the banana it contained. In short, the beverage was sweet and agreeable.

EXAMPLE 16

A 100 g of dried persimmon flesh was added to 200 g of the fermentation product of Example 14 and the mixture was smashed into paste. The obtained pasty mixture was then put into a hot air drier for drying and the dried product was ground into a powdery state. Thereafter, a 150 cc of 80° C. hot water was added to a 20 g of the obtained powdery foodstuff, which was then stirred well to produce a homogeneous hot beverage. While the beverage did not show the taste and the fragrance of dried persimmon flesh, it showed a slight stickiness attributable to the persimmon flesh it contained. It was more sweet than the beverage of Example 15. Thus, in short, the beverage was also sweet and agreeable.

EXAMPLE 17

A 100 g of sweetened flesh of ume (*Prunus mume*, Japanese apricot) was added to a 200 g of the fermentation product of Example 14 and the mixture was smashed into paste. The obtained pasty mixture was then put into a hot air drier for drying and the dried product was ground into a powdery state. Thereafter, a 150 cc of 80° C. hot water was added to a 20 g of the obtained foodstuff, which was then stirred well to produce a homogeneous hot beverage. The beverage was highly sweet and sour due to the sweetened flesh of ume (*Prunus mume*, Japanese apricot) and showed the fragrance specific to the fermentation product, although it was practically not sticky. In short, the beverage was agreeable to the throat.

Other Modes of Carrying out the Invention

In other modes of carrying out the invention, seasoned and boiled beans may be used to produce a fermentation product. Beans of two or more than two different types may be mixed to produce a fermentation product according to the invention. Such a fermentation product may also be used to produce a dry foodstuff, a baked foodstuff, a powdery foodstuff or a beverage according to the invention. Additionally, the beverage prepared by adding liquid to a fermentation product according to the invention may be filtered to eliminate any coarse feeling and make it more agreeable to the tongue.

Advantages of the Invention

A fermentation product according to the invention is rich with nutrients because it uses beans as raw material. Additionally, it is digested well by the gastrointestinal tract because it is fermented. A fermentation product according to the invention has a novel and agreeable taste as it does not contain salt or contains salt only to a small extent. Additionally, no lees nor dregs are produced in the course of fermentation to raise the manufacturing yield. A foodstuff or a beverage prepared by using a fermentation product according to the invention also provides the above advantages.

Thus, the present invention provides a fermentation product produced by using beans as raw material and also a variety of foodstuffs and beverages produced by using such a fermentation product as raw material that are novel, tasty and rich of nutrients but do not contain salt or, if they do, contain salt only to a small degree. Such products are highly effective and useful as dietary food or drink.

What is claimed is:

1. A beverage comprising in a mixed state, a kayu-like fermentation product prepared from salt-less boiled beans and koji yeast added thereto; and drinking liquid added to said kayu-like fermentation product.

2. A beverage according to claim 1, wherein said drinking liquid is one or more than one of the liquids selected from the group consisting of mineral water, carbonated drink, fruit juice, vegetable juice, alcoholic drink, and soup.

* * * * *